US008385491B2

(12) United States Patent
Hadad

(10) Patent No.: US 8,385,491 B2
(45) Date of Patent: Feb. 26, 2013

(54) SYNCHRONIZATION SYSTEM AND METHOD

(76) Inventor: Zion Hadad, Rishon Lezion (IL)

( * ) Notice: Subject to any disclaimer, the term of this patent is extended or adjusted under 35 U.S.C. 154(b) by 1229 days.

(21) Appl. No.: 11/117,411

(22) Filed: Apr. 29, 2005

(65) Prior Publication Data

US 2005/0207446 A1 Sep. 22, 2005

(51) Int. Cl.
*H04L 7/00* (2006.01)
(52) U.S. Cl. .......................................... 375/354
(58) Field of Classification Search .............. 375/342, 375/354–355, 359, 368
See application file for complete search history.

(56) References Cited

U.S. PATENT DOCUMENTS

| | | | | |
|---|---|---|---|---|
| 5,307,349 A | * | 4/1994 | Shloss et al. | 370/442 |
| 5,425,032 A | * | 6/1995 | Shloss et al. | 370/346 |
| 6,081,570 A | * | 6/2000 | Ghuman et al. | 375/368 |
| 6,192,498 B1 | * | 2/2001 | Arato | 714/781 |
| 6,983,031 B2 | * | 1/2006 | Wheatley | 375/368 |
| 8,018,937 B2 | * | 9/2011 | Epps et al. | 370/392 |
| 8,175,015 B1 | * | 5/2012 | Chowdhuri et al. | 370/300 |
| 2005/0157715 A1 | * | 7/2005 | Hiddink et al. | 370/389 |
| 2005/0185609 A1 | * | 8/2005 | Malkamaki | 370/328 |
| 2006/0198442 A1 | * | 9/2006 | Jutzi | 375/240.16 |

\* cited by examiner

*Primary Examiner* — Jean B Corrielus
(74) *Attorney, Agent, or Firm* — Smith Risley Tempel Santos LLC; Gregory Scott Smith

(57) ABSTRACT

In a system packing multiple PDUs on a single physical burst and using OFDM or OFDMA, a synchronization method comprising: a. performing an initial lock; b. processing each new header information, verifying if checksum OK, and if OK—remain in (b), system is in locked state; c. activating new header seeker, to enable running window processor to compare the expected checksum with the last byte as tentative checksum; d. declaring Tentative lock, when detecting a checksum correspondence; e. declaring Final lock, when two or more consecutive successful detections of headers, at their expected locations based on prior detections, then Goto (b).

4 Claims, 2 Drawing Sheets ically to the present invention relates to a system and method for

SYNCHRONIZATION SYSTEM AND METHOD

FIELD OF THE INVENTION

The present invention relates to a system and method for synchronization in systems packing multiple PDUs on a single physical burst and using OFDM or OFDMA.

BACKGROUND OF THE INVENTION

The invention addresses the problem of synchronization loss when packing multiple PDUs on a single physical burst in the standard IEEE 802.16 in PHY modes OFDM and OFDMA.

When packing multiple PDUs (=MAC Protocol Data Units) on a single physical burst, there are situations in which a transmission error corrupts part of the burst, and thus leads to the destruction of one or more MAC PDU headers. As the MAC PDU header contains the length of the PDU and hence the location of subsequent PDUs, such an error will lead to loss of synchronization and thus the entire physical burst will have to be discarded.

A more robust synchronization method is thus desirable.

SUMMARY OF THE INVENTION

According to the present invention, there is provided a system and method for achieving improved synchronization.

A new method is used to re-synchronize the reception process and prevent the loss of the entire physical burst when a situation such as that detailed above occurs.

Re-synchronization is done based on the fact that each PDU header includes a header checksum field. The re-synchronization hardware scans the received physical burst byte by byte, and for each byte assuming it is the beginning of a MAC PDU header.

If the byte in question is indeed the beginning of a new PDU MAC header, then the calculated checksum value on the first five bytes will equal the value in the sixth bytes, and re-synchronization of the physical burst may be declared.

If the subsequent MAC PDU headers are found to be invalid (as can be tested by the match of their header checksum field to their contents), then the hardware may conclude the re-synchronization has been falsely declared.

Further objects, advantages and other features of the present invention will become obvious to those skilled in the art upon reading the disclosure set forth hereinafter.

DETAILED DESCRIPTION OF THE PREFERRED EMBODIMENTS

A preferred embodiment of the present invention will now be described by way of example and with reference to the accompanying drawings.

According to the invention, a byte-wide, running-window method is used to re-synchronize the reception process.

This may help prevent the loss of the entire physical burst, when a transmission error corrupts part of the burst, and thus leads to the destruction of one or more MAC PDU headers.

Figure 1:
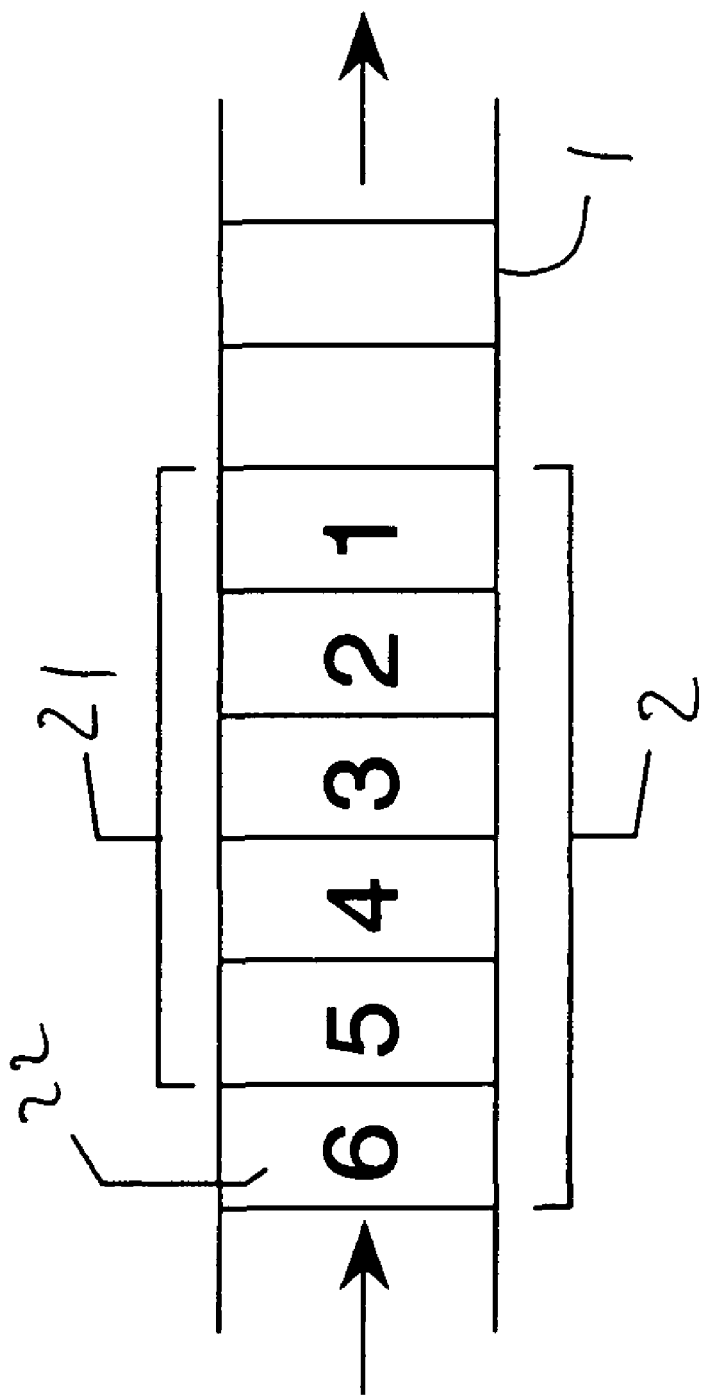
FIG. 1 illustrates a running window comprising tentative header bytes and a checksum, within the received bytes stream.

FIG. 1 illustrates a running window 2 comprising tentative header bytes 21 and a checksum byte 22, within the received bytes stream 1.

Synchronization Method 1 a. In a running window comprising a group of consecutively received bytes, the last bytes received are processed to find whether they conform to the structure of a PDU header. Recognizing a PDU header is done based on the fact that each PDU header includes a header checksum field.

b. There is a re-synchronization hardware which shifts bytes in, continuously scanning the received physical burst byte by byte and computing a header checksum under the assumption that this is a PDU header. The computed checksum is then compared with the data that is supposed to be the checksum in that group of bytes. If the two numbers corresponds, there is a large likelihood that, indeed, the group of bytes now being tested form a valid PDU header.

c. Thus, for each byte the method assumes that it is the beginning of a MAC PDU header, then verifies it. This assumption is verified by calculating the header checksum on this byte and the four bytes following it, and comparing the result to the value of the byte following these five bytes.

If the byte in question is indeed the beginning of a new PDU MAC header, then the calculated checksum value on the first five bytes will equal the value in the sixth bytes, and re-synchronization of the physical burst may be declared.

d. There is of course a certain chance that, due to the randomness of the information, synchronization will be falsely declared. This issue may be handled by continuing with the physical burst demodulation process, and verifying that following the first PDU there is a second valid PDU, and so on, to whatever depth is required.

e. If the subsequent MAC PDUs headers are found to be invalid (as can be tested by the match of their header checksum field to their contents), then the hardware may conclude the re-synchronization has been falsely declared, and may continue to seek re-synchronization as described previously. END.

Method 2 a. Performing an Initial lock b. Process each new header information, verify if checksum OK. If OK—remain in (b), system is in locked state.

c. Activate new header seeker—enable running window processor to compare the expected checksum with the last byte as tentative checksum.

d. Declare Tentative lock—when detects checksum correspondence e. Declare Final lock—when two or more consecutive successful detections of headers, at their expected locations based on prior detections then return to (b).

Note: The number of consecutive successes to enter the final lock state (step e) may be set up by the system designer, according to engineering considerations applicable to this system.

Figure 2:
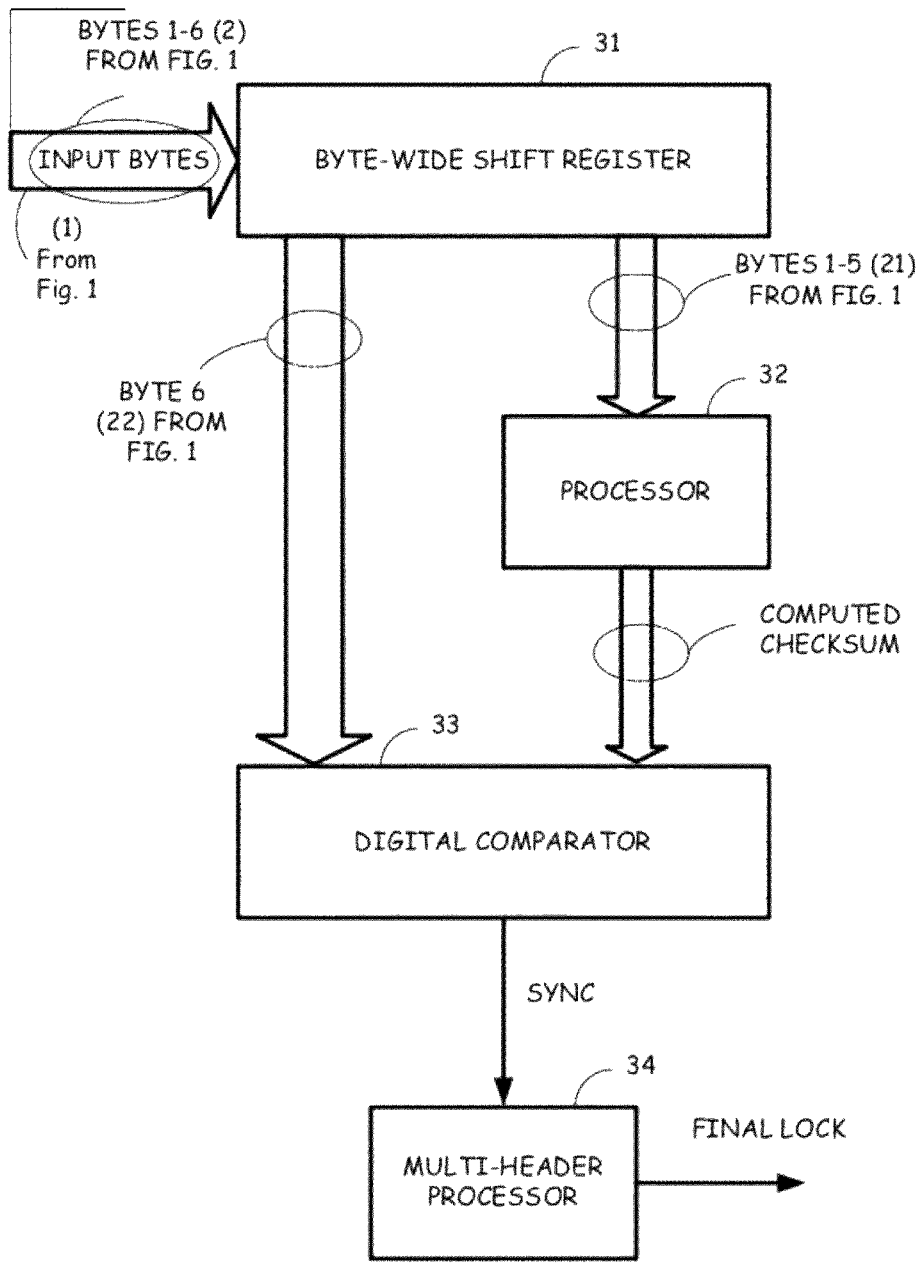
FIG. 2 details a system for processing input bytes for detecting a new PDU headers sequence.

FIG. 2 details a system for processing input bytes for detecting a new PDU headers sequence. The received data is input to a byte-wide shift register 31. A processor 32 computes the checksum of several consecutive bytes in the shift register, five in this example.

Digital comparator means 33 compare the computed checksum in unit 32 with the next received byte 22, see FIG. 1, to declare a sync detection if the result is positive.

The multi-header processor 34 correlates results over a plurality of headers, to declare Final lock when two or more consecutive successful detections of headers are found, at their expected locations based on prior detections.

It will be recognized that the foregoing is but one example of an apparatus and method within the scope of the present invention and that various modifications will occur to those skilled in the art upon reading the disclosure set forth hereinbefore.

What is claimed is:

1. In a system packing multiple medium access control protocol data units (MAC PDUs) on a single physical burst and using orthogonal frequency-division multiplexing (OFDM) or orthogonal frequency-division multiple access (OFDMA), a synchronization method comprising:
   in a running window comprising a group of consecutively received bytes,
      performing a synchronization by shifting bytes of said group of bytes into the running window,
      continuously scanning the group of bytes, byte by byte, wherein for each byte, assuming that said byte is the beginning of a MAC PDU header, then verifying that said byte is the beginning of a MAC PDU header by calculating the header checksum on said byte and four bytes following said byte, and comparing the result to the value of a sixth byte following said five bytes and wherein, if the byte in question is indeed the beginning of a new MAC PDU header, then the calculated checksum value on the first five bytes will equal the value in the sixth byte, and synchronization of the physical burst is declared and declaring there is a large likelihood that the bytes form a valid MAC PDU header.

2. In a system packing multiple medium access control protocol data units (MAC PDUs) on a single physical burst and using orthogonal frequency-division multiplexing (OFDM) or orthogonal frequency-division multiple access (OFDMA), a synchronization method comprising:
   performing a synchronization by shifting consecutively received bytes into a running window,
   continuously scanning the bytes in the order received, wherein for each byte, determining if said byte is the beginning of a MAC PDU header by calculating a header checksum on said byte and the four bytes following said byte, and, determining the occurrence of synchronization of a valid MAC PDU header if the calculated header checksum value on the first five bytes is equal to the value in the sixth byte;
   verifying synchronization of the valid MAC PDU header by examining the received bytes for a subsequent MAC PDU header.

3. The synchronization method according to claim 2, wherein, if the subsequent MAC PDU header is found to be invalid, then concluding a false synchronization, and continuing to examine the bytes to determine synchronization.

4. In a system packing multiple medium access control protocol data units (MAC PDUs) on a single physical burst and using orthogonal frequency-division multiplexing (OFDM) or orthogonal frequency-division multiple access (OFDMA), a synchronization method comprising:
   performing a synchronization by shifting consecutively received bytes into a running window,
   continuously scanning the bytes in the order received, wherein for each byte, determining if said byte is the beginning of a MAC PDU header by calculating a header checksum on said byte and the four bytes following said byte, and, wherein recognizing a MAC PDU header is done based on the fact that each MAC PDU header includes a header checksum field, determining the occurrence of synchronization of a valid MAC PDU header if the calculated header checksum value on the first five bytes is equal to the value in the sixth byte.

* * * * *